US008850075B2

(12) United States Patent
Zhu et al.

(10) Patent No.: US 8,850,075 B2
(45) Date of Patent: Sep. 30, 2014

(54) PREDICTIVE, MULTI-LAYER CACHING ARCHITECTURES

(75) Inventors: Wenwu Zhu, Basking Ridge, NJ (US); Zheng Li, Anhui (CN); Roberto R. Molinari, Bellevue, WA (US); Hongzhi Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 262 days.

(21) Appl. No.: 13/177,058

(22) Filed: Jul. 6, 2011

(65) Prior Publication Data

US 2013/0014064 A1 Jan. 10, 2013

(51) Int. Cl.
| | |
|---|---|
| G06F 15/16 | (2006.01) |
| G06F 3/048 | (2013.01) |
| G06F 17/30 | (2006.01) |
| G06T 1/20 | (2006.01) |
| G06T 15/20 | (2011.01) |
| H04N 1/00 | (2006.01) |
| H04L 29/08 | (2006.01) |
| H04N 5/00 | (2011.01) |
| H04W 4/18 | (2009.01) |

(52) U.S. Cl.
CPC .............. *G06F 15/16* (2013.01); *G06F 17/30* (2013.01); *G06T 1/20* (2013.01); *G06T 15/205* (2013.01); *H04N 1/00* (2013.01); *H04W 4/18* (2013.01); *H04L 67/2885* (2013.01); *H04L 67/2847* (2013.01); *H04N 5/00* (2013.01); *G06T 2200/16* (2013.01)
USPC .......... 709/249; 709/217; 709/219; 715/850; 715/854; 715/862

(58) Field of Classification Search
USPC ....................................................... 709/249
See application file for complete search history.

(56) References Cited

U.S. PATENT DOCUMENTS

| | | | |
|---|---|---|---|
| 7,340,499 | B1 | 3/2008 | Casella |
| 7,437,509 | B2 | 10/2008 | Vayssiere |

(Continued)

FOREIGN PATENT DOCUMENTS

| | | |
|---|---|---|
| EP | 1041497 A2 | 10/2000 |
| WO | WO2006129308 A1 | 12/2006 |
| WO | WO2011075019 A1 | 6/2011 |

OTHER PUBLICATIONS

Liu Exploitation of Location-dependent Caching and Prefetching Techniques for Supporting Mobile Computing and Communications, Wireless-94, (1994).*

(Continued)

*Primary Examiner* — David Lazaro
*Assistant Examiner* — Robert Shaw
(74) *Attorney, Agent, or Firm* — Carole Boelitz; Micky Minhas; Lee & Hayes PLLC

(57) ABSTRACT

Predictive, multi-layer caching architectures may be used to predict which elements a user is most likely to navigate to within a collection of elements associated with a predefined layout and, in response, to increase the accessibility of these elements to a client device of the user. For instance, the techniques may utilize a predictive, multi-layer caching architecture for storing these predicted elements to decrease the latency to render these images if the user navigates within the collection of elements in the predicted manner. The collection of elements may comprise images (e.g., a 3D model, a map, etc.), video files, audio files, text files, or any other type of file that is consumable on a client device.

15 Claims, 12 Drawing Sheets

(56) References Cited

U.S. PATENT DOCUMENTS

| | | | |
|---|---|---|---|
| 7,797,064 | B2 | 9/2010 | Loomis et al. |
| 2002/0021353 | A1 | 2/2002 | DeNies |
| 2002/0067353 | A1* | 6/2002 | Kenyon et al. ............... 345/419 |
| 2002/0067379 | A1* | 6/2002 | Kenyon et al. ............... 345/838 |
| 2004/0030832 | A1* | 2/2004 | Squibbs .......................... 711/118 |
| 2004/0132467 | A1* | 7/2004 | Hull et al. ...................... 455/458 |
| 2006/0095401 | A1 | 5/2006 | Krikorian et al. |
| 2006/0200382 | A1* | 9/2006 | Arutunian et al. .............. 705/14 |
| 2007/0013708 | A1* | 1/2007 | Barcklay et al. ............... 345/557 |
| 2007/0080830 | A1* | 4/2007 | Sacks .......................... 340/995.1 |
| 2008/0082549 | A1* | 4/2008 | Baker et al. ...................... 707/10 |
| 2008/0140529 | A1 | 6/2008 | Agarwal et al. |
| 2008/0181498 | A1* | 7/2008 | Swenson et al. ............... 382/173 |
| 2008/0320151 | A1* | 12/2008 | McCanne et al. ............. 709/228 |
| 2009/0037382 | A1* | 2/2009 | Ansari et al. ...................... 707/3 |
| 2009/0106265 | A1* | 4/2009 | Turner et al. ...................... 707/10 |
| 2009/0281718 | A1* | 11/2009 | Gibran et al. ................. 701/200 |
| 2009/0326810 | A1* | 12/2009 | Callaghan et al. ............ 701/208 |
| 2009/0327390 | A1* | 12/2009 | Tran et al. ...................... 709/201 |
| 2010/0021013 | A1* | 1/2010 | Gale et al. ...................... 382/113 |
| 2012/0173977 | A1* | 7/2012 | Walker et al. ................. 715/716 |

OTHER PUBLICATIONS

Dilley et al, Enhancement and Validation of Squid's Cache Replacement Policy.*

Dilley et al, Enhancement and Validation of Squid's Cache Replacement Policy).*

M. Raunak, A Survery of Cooperative Caching, Dec. 1999.*

Dilley et al, Enhancement and Validation of Squid's Cache Replacement Policy, HPL-1999-69 (May 1999).*

Armstrong et al Efficient and Transparent Dynamic Content Updates for Mobile Clients, MobiSys'06, ACM (2006). pp. 56-68.*

Kim et al, Prefetching Tiled Internet Data Using a Neighbor Selection Markov Chain, IICS 2001, LNCS 2060 Springer (2001), pp. 103-115.*

Nowaks, " "Intelligent" Image Caching for WP 7", retrieved at <<http://blogs.compactframework.de/Peter.Nowak/2010/08/12/IdquoIntelligentrdquo+Image+Caching+For+WP+7.aspx>>, Peter Nowaks Mobile Blog, Aug. 12, 2010, 2 pages.

"The Research on Client Semantic Caching in Mobile Database", retrieved at <<http://www.latest-science-articles.com/IT/The-Research-on-Client-Semantic-Caching-in-Mobile-Database-8411.html>>, Latest Science Articles, Mar. 17, 2010, 4 pages.

Yang, et al., "On the Content Predictability of Cooperative Image Caching in Ad Hoc Networks", Proceedings of the 7th International Conference on Mobile Data Management, 2006, 8 pages.

The Supplementary European Search Report mailed May 26, 2014 for European Patent Application No. 12807555.3, 4 pages.

The European Office Action mailed Jun. 13, 2014 for European patent application No. 12807555.3, a counterpart foreign application of U.S. Appl. No. 13/177,058, 5 pages.

\* cited by examiner

PREDICTIVE, MULTI-LAYER CACHING ARCHITECTURES

BACKGROUND

Certain software applications analyze digital photographs from a particular scene and generate a three-dimensional (3D) reconstruction or model of the scene. A user of such an application is therefore able to generate a model using the software and then upload the model to a website for later viewing by the user or by other users of the website. For instance, a user may capture a series of photographs of the Eiffel Tower in Paris using a camera and may later transfer these photos to a personal computer of the user. Once the photos reside on the personal computer, the user may generate a 3D model of the photos and then upload this 3D model to a specified website. This user or other users may then view this 3D model of the Eiffel Tower via the specified website.

In order to view the example 3D model on a client computing device, the client device first requests a file that specifies a layout associated with the multiple images that collectively define the 3D model. The client device may also request one or more images for rendering on a display of the device as a starting point of the 3D model. Thereafter, as the user navigates within and to different portions of the 3D model, the client device requests images associated with the locations to which the user navigates. However, because the client device requests the desired images after the user requests to view these images, the user often experiences undesirable latency while the client device requests and waits to receive these images. Furthermore, when the user is viewing the collection over a high-latency network or on a device having limited memory or computational power (e.g., a mobile phone), the latency that the user experiences may be significant.

SUMMARY

This document describes, in part, techniques for predicting which images a user is most likely to navigate to within a collection of images associated with a predefined layout and, in response, increasing the accessibility of these images to a client device of the user. For instance, the techniques may utilize a predictive, multi-layer caching architecture for storing these predicted images to decrease the latency to render these images if the user navigates within the collection in the predicted manner.

In some examples, the techniques described below may store images of a collection of images on a storage server that connects with a prediction server. The prediction server may in turn connect to a proxy server, which in turn connects with a client device rendering a portion of the collection of images. In response to determining that a user of the device is viewing a particular image of the collection of images on the client device, the prediction server may retrieve and send to the proxy server: (1) a first set of images that are immediately adjacent to the particular image currently being rendered, and (2) a second set of images that are immediately adjacent to the immediately adjacent images. In response to receiving these two sets of images, the proxy server may send the first set to the client device for storing in a cache of the client device, while storing the second set in a cache of the proxy server itself. In response to the user navigating to another image within the collection, the prediction server may repeat the prediction again to ensure that the client device and the proxy server store the predicted images in the respective caches. By distributing predicted images closer to the client device, the techniques may reduce a latency experienced by the user navigating within the collection of images.

This summary is provided to introduce concepts relating to reducing latency for users navigating within image collections having predefined layouts. These techniques are further described below in the detailed description. This summary is not intended to identify essential features of the claimed subject matter, nor is it intended for use in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
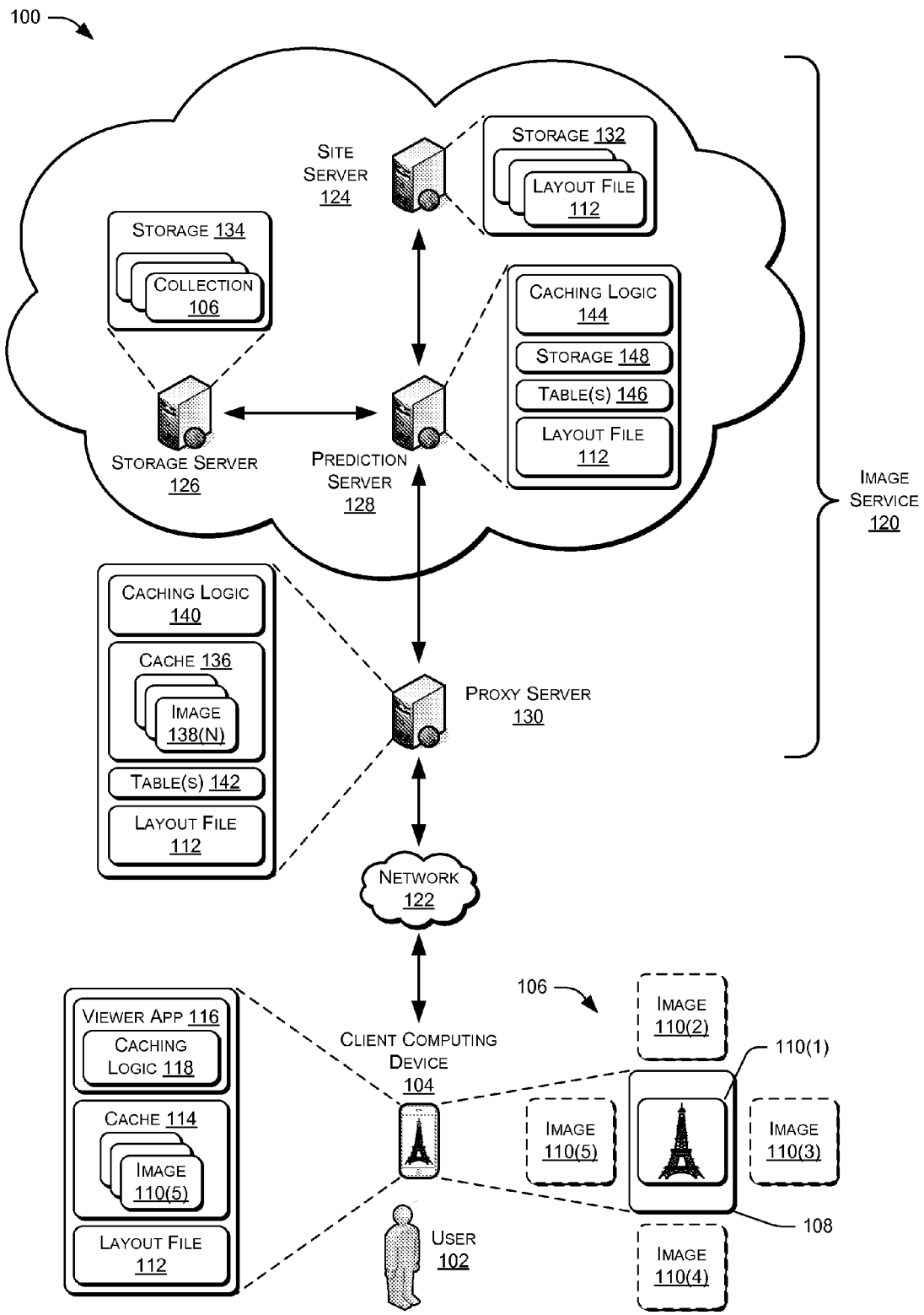
FIG. 1 illustrates an example computing architecture that includes a user operating a client device to render a portion of a collection of images associated with a predefined layout, with the collection being made available to the client device over a network and from an image service. In this architecture, a prediction server may predict which images within the collection the user is most likely to view next and, in response, distribute these predicted images closer to the client (e.g., on a cache of a client device and/or on a cache of a proxy server).

This document describes, in part, techniques for predicting which elements a user is most likely to navigate to within a collection of elements associated with a predefined layout and, in response, increasing the accessibility of these elements to a client device of the user. For instance, the techniques may utilize a predictive, multi-layer caching architecture for storing these predicted elements to decrease the latency to render these elements if the user navigates within the collection in the predicted manner. While the following examples describe these techniques with reference to image collections, the techniques may similarly be utilized for other collections of elements. In that regard, the collection of elements may comprise images (e.g., a three-dimensional (3D) model, an on-line map, a video game, etc.), video files, audio files, text files, or any other type of file that is consumable on a client device and has a predefined layout.

For instance, a user may operate a client device to render a map (e.g., an on-line map), a 3D model of a scene, or any other collection of images that is associated with a predefined layout. In each of these instances, the client device may access the images over a network and from an image service that stores the collection. In some instances, existing techniques may provide an entire image collection to a client device when a user of the device first requests to view the image collection. However, because of network constraints, the size of the image collection, and, in some instances, the limited capabilities of the client device, other existing techniques may provide images to the client device on-demand. That is, the client device may request images—and, hence, receive and render these images—after the user of the device navigates to the corresponding images within the collection. As described above, however, retrieving images in this manner may result in undesirable latency to the user while the client device waits to receive the images from the image service over the network.

Contrasted with these traditional approaches, this document describes architectures that allow for caching images of an image collection closer to the client device to reduce the latency associated with navigating within the image collection. For instance, an example architecture may include an image service that includes a storage server to store the image collection in its entirety, a prediction server to predict which images a user is most likely to navigate to based on a currently viewed image, and a proxy server to store a portion of these predicted images. In addition to the image service, the architecture may also include a client device to both render a portion of the collection and store a different portion of these predicted images. In some instances, the proxy server resides between the client device and the prediction and storage servers, such that the images stored on the proxy server are nearer to the client device than the images stored on the storage server.

To illustrate, envision that a user of a mobile phone navigates to a website and requests to view a 3D model, a map, or another collection of images having a predefined layout. In response to this request, the website may retrieve a layout file (e.g., a JavaScript Object Notation (JSON) file) from the storage server and may serve this file to the client device. This layout file may describe the positions of the images of the collection relative to one another, as well as specify where each image of the collection is located on the storage server. In some instances, this and each subsequent communication with the client device may pass through both the prediction and proxy servers, while in other instances these communications may occur directly between the storage server and the client device or in any other manner.

In addition to receiving the layout file, the image service may also provide one or more initial images of the collection for rendering on the client device. In addition, the image service may provide one or more images that are immediately adjacent to the rendered images. The client device may store the immediately adjacent images in a cache of the client, such that these images are easily retrievable and renderable by the client device in the event that the user navigates within the image collection to these adjacent images.

Furthermore, when the user makes the initial request to receive and render the image collection, the image service may also provide one or more images to the proxy server. For instance, the prediction server of the image service may retrieve, from the storage server, one or more images that are immediately adjacent to the immediately adjacent images stored in the cache of the client device. Because the proxy server resides between the storage server and the client device, the client device may access images stored on the proxy server faster than images stored on the storage server.

After the client device has begun rendering the image collection having the predefined layout, the user of the device may navigate within the collection. For instance, if the image collection comprises a 3D model, the user may navigate to different portions of the model. Or, if the image collection comprises a map, the user may navigate to different portions of the map. In each of these instances, the user may often navigate in a direction that is immediately adjacent to the user's current location within the image collection. For instance, in both the 3D model and map examples, the user may move to the left, right, forwards, or backwards.

In these instances, the client device may retrieve the appropriate immediately adjacent image from the cache and may render this retrieved image. Because the client has previously stored this image in the cache, the client is able to render the image much faster than if the client were to request the image from the image service across the network. As such, the user experiences less latency.

Furthermore, when the user navigates within the image collection in this manner, the client device may send an indication of the navigation to the proxy server. In response to receiving the indication that the client device is rendering a new image, the proxy server may retrieve and send some or all of the images stored in the cache of the proxy server to the client device. At this point, because the user has navigated to the new image, these images being sent to the client from the cache of the proxy server are now the "immediately adjacent images," since these images are immediately adjacent to the image being currently rendered as specified in the predefined layout.

In addition to sending these images to the client device for storing in the cache of the client, the proxy server may pass the received indication along to the prediction server. In response, the prediction server may identify, within the predefined layout, the location of the image currently being rendered. With this information, the prediction server may identify the following two sets of images: (1) images that are immediately adjacent to the image currently being rendered, and (2) images that are immediately adjacent to the images of the first set. The prediction server may then identify which, if any, of these two sets of images the prediction server has previously provided to the proxy server and/or the client device, and may then send to the proxy server those images of the first and second sets that the prediction server has yet to send.

In this example, the prediction server will determine that it has previously sent images of the first set to the proxy server, but not each image of the second set. As such, the prediction server will retrieve these images from the prediction server and will serve them to the proxy server. In response to receiving these images, the proxy server will store the images in its cache.

By utilizing a two-layer caching architecture (via the client device and the proxy server), the example architecture described above is able to support faster rendering of the image collection as the user navigates within the image collection. That is, because the images that the user is most likely to navigate to next (i.e., the immediately adjacent images) are stored in the cache of the client, the client device may quickly render these images in the event that the user navigates in the predicted manner.

Furthermore, because the images that the user is most likely to navigate to after the first predicted navigation are stored in the cache of the proxy server (i.e., the images immediately adjacent to the immediately adjacent images), the client device is able to quickly refill its cache after rendering an "immediately adjacent image" from the cache of the client. Finally, because the prediction server continues to predict a user's navigations based on the user's past navigations, the prediction server ensures that both the cache of the proxy server and the cache of the client device continue to receive and store the predicted images. In total, this architecture reduces the latency experienced by the user navigating within the image collection, even if the user changes views within the image collection at a high frequency. In addition, because this architecture tracks how users navigate within image collections, entities that provide the image collections may learn how users typically interact with these collections. That is, these entities may learn how users typically navigate through a 3D model, within a map, or the like. These entities may then use this information to improve user experiences by providing recommendations, enhancing certain aspects of the image collections, or the like.

The detailed discussion below begins with a section entitled "Example Computing Architecture", which describes in detail an example predictive, multi-layer caching architecture for implementing the techniques described herein. This section also describes an example flow of operations within the architecture as a user navigates within an example image collection having a predefined layout. A second section entitled "Example Image-Prediction Process" follows, before the discussion proceeds to a section entitled "Example Caching Logic." This latter section details example caching logic that the proxy server of FIG. 1 may employ, as well example caching logic that the prediction server of FIG. 1 may employ. Next a section entitled "Example Computing-Device Components" follows, before a brief conclusion ends the discussion.

This brief introduction, including section titles and corresponding summaries, is provided for the reader's convenience and is not intended to limit the scope of the claims, nor the proceeding sections.

Example Computing Architecture

FIG. 1 illustrates an example computing architecture 100 that may implement the described techniques for: (1) predicting which images a user is most likely to navigate to within a collection of images associated with a predefined layout and, (2) in response, increasing the accessibility of these images to a client device of the user.

In this example, the architecture 100 includes a user 102 operating a client computing device (or "client device") 104 to render an image collection 106 on a display 108 of the device 104. For instance, the image collection 106 may comprise a map, a three-dimensional (3D) model of a scene that has been created from a series of digital photographs, or any other type of visual file comprising a collection of images having a predefined layout. In this example, the image collection 106 comprises a 3D model of a scene that includes the Eiffel Tower in Paris, France, possibly created with use the Photosynth® software from Microsoft® Corporation. While illustrated as a mobile phone, the client computing device 104 may comprise any other sort of computing device, such as a desktop computer, a laptop computer, a portable music player, a gaming console, a tablet computing device, or any other type of mobile or non-mobile computing device.

As illustrated, the client device 104 currently renders a particular image 110(1) of the collection of images. In this example, the client device 104 also stores images 110(2), 110(3), 110(4), and 110(5) in a cache 114 or other storage of the device 104. As illustrated, each of the images 110(2)-(5) may be immediately adjacent to the currently rendered image according to a predefined layout of the image collection 106, as specified by a layout file 112 previously obtained and stored on the device 104. Furthermore, and as discussed in detail below, by storing the immediately adjacent images 110(2)-(5) in the cache 114 of the device 104, the device 104 is able to quickly render one of these images in the event that the user 102 navigates left, right, forwards, or backwards within the 3D model that the display 108 currently renders.

As discussed briefly above, the layout file 112 indicates a relative position of each image of the image collection 106 relative to one another, such that the client device is able to correctly request and render images of the collection 106. In addition, the layout file 112 may indicate (e.g., via a uniform resource locator (URL)) where each image of the image collection 106 resides on the storage server 126. The client device 104, the proxy server 130, and/or the prediction server 128 may utilize this information to request images according to the navigation of the user 102 within the image collection 106.

In order to render the 3D model (i.e., the example image collection 106), the client device 104 may store a viewer application 116, which itself may store or otherwise reference caching logic 118. The viewer application (or "viewer app") 116 may comprise a browser, a specific application previously downloaded to the device 104 to view the collection 106, or any other application that is native or non-native to the device 104. The caching logic 118, meanwhile, identifies the image 110(1) currently being rendered, as well as the images 110(2)-(5) that are immediately adjacent to the currently rendered image. Furthermore, as the user 102 navigates within the image collection 106, the caching logic 118 updates which image is currently being rendered, as well as which images are immediately adjacent to the currently rendered image, as discussed in more detail below. In addition, the caching logic 118 places the newly labeled, immediately adjacent images into the cache 114 of the client device 104 if these images are stored on a different storage of the device 104 when these images are set as "immediately adjacent images".

To initially render the image collection 106, the user 102 may utilize the viewer application 116, a browser, or another application to request or otherwise access the image collection 106 on an image service 120. As illustrated, the image service 120 may comprise a site server 124 that hosts a site (e.g., a website) of the image service 120, a storage server to store different image collections, such as the image collection 106, a prediction server 128 to predict which images of a collection a user is most likely to navigate to at a certain moment in time, and a proxy server 130 to store at least a portion of the predicted images. While each of the servers above is listed singularly (e.g., "a prediction server 128"), it is to be appreciated that the functionality stored on some or each of these servers may be distributed across multiple discrete servers. Furthermore, in some instances the architecture 100 may include multiple different proxy servers that each interact with the prediction server 128 of the image service 120. These proxy servers may be specific to different client devices based on geography and/or latency. For instance, a proxy server nearest a particular client device may serve as the proxy server for that particular client.

Returning to the example above, the user 102 may initially utilize a browser application to access a website of the image service 120 hosted by the site server 124 for the purpose of accessing and rendering the image collection 106. For instance, upon navigating to the website hosted by the site server 124, the user may select a URL that is associated with the particular image collection 106. In response, the URL may instruct the site server to provide the layout file 112 associated with the image collection 106 to the client computing device 104. In addition, this selection may launch the viewer application 116 for viewing the image collection 106 in some instances. While FIG. 1 illustrates that the layout files associated with the image collections may be stored on a storage 132 of the site server, in other instances these layout files may be stored on or accessible by a storage 134 of the storage server or another entity.

In either instance, upon selecting a URL associated with the layout file 112 and the image collection 106, the image service 120 may serve the layout file 112 to the client device 104. In addition, the image service 120 may provide one or more initial or starting images for rendering the image collection 106 at a first location. In the illustrated example, for instance, the image service 120 may provide the images 110 (1)-(5) along with the layout file 112. The image 110(1) may be the initial image for rendering, while the image service 120 may provide the images 110(2)-(5) (which are immediately adjacent to the image 110(1)) for storing in the cache 114 of the client device 104. As depicted, the image 110(1) for initial rendering comprises a centered view of the Eiffel Tower in Paris France in the illustrated example.

Upon receiving the layout file 112 and the images 110(1)-(5), the client device 104 may parse the layout file 112 to identify positions of the received images 110(1)-(5). For instance, the caching logic 118 of the client device 104 may parse the layout file 112 to identify that the image 110(1) is to be initially rendered while the images 110(2)-(5) are to be stored in the cache 114 in the event that the user 102 navigates to one of these immediately adjacent images within the image collection 106.

In some instances, the image service 120 (e.g., the prediction server 128) may also provide, to the proxy server 130, the layout file 112 and one or more images upon the initial request of the user 102 to render the image collection 106. For instance, the image service may identify, with use of the layout file 112 associated with the image collection 106, images that are immediately adjacent to the images 110(2)-(5) and may provide these images and the images 110(1)-(5) for storing in a cache 136 or other storage of the proxy server 130. That is, the image service 120 may provide images that are immediately adjacent to the images that are immediately adjacent to the image 110(1) that will be initially rendered by the client device 104.

As illustrated, because the proxy server 130 resides closer to the client device than does the storage server 126 (either geographically, in terms of latency, or both), providing these images to the proxy server 130 increases the accessibility of these images to the client device 104. In the illustrated example, the image service 120 has provided images 138(1)-(N) for storage in the cache 136 of the proxy server 130, with these images being immediately adjacent to (and potentially including) the images 110(2)-(5). In response to receiving these images, the proxy server 130 may store them in the cache 136 using a dictionary data structure with keys and values, such that the proxy server 130 may quickly retrieve and serve these images in response to receiving an indication that a user has navigated to a new image within the image collection 106.

After the client device 104 parses the layout file 112 and renders the starting image 110(1), the user 102 may begin navigating to other portions of the image collection 106. For instance, envision that the user 102 requests to navigate "to the left". In response, the client device 104 may retrieve the image 110(5) from the cache 114 of the device 104 and may render this image 110(5) on the display 108. Because this image was stored in the cache 114, the client device 104 may be able to quickly retrieve and render this image 110(5) without the user 102 experiencing undue latency.

After this navigation, the caching logic 118 may thereafter indicate that the image 110(5) is the image currently being rendered, and may identify and indicate those images that are immediately adjacent to the image 110(5). Furthermore, the caching logic 118 may store these new immediately adjacent images in the cache 114. In some instances, the caching logic may also remove from the cache 114 any other images that are not immediately adjacent to the image 110(5). For instance, the caching logic 118 may store these other images in different storage of the client device 104 or may delete the images from memory of the device 104.

Furthermore, after this navigation, the caching logic 118 may send an indication of the navigation over the network 122 to the proxy server 130. This indication may take the form of a request for additional images for storage in the cache 114 of the client device 104. Furthermore, this indication may identify the client device 104 as well as the particular image collection 106 that the client device 104 currently renders. Upon receiving the indication, caching logic 140 stored on or accessible by the proxy server may identify the image currently being rendered on the client device 104 (here, image 110(5)) and may identify, with use of the layout file 112, one or more images that are now immediately adjacent to the image 110(5). In this example, a portion of the images 138 (1)-(N) previously stored in the cache 136 of the proxy server 130 will comprise the images that are immediately adjacent to the image 110(5). As such, the proxy server 130 may send this portion of the images 138(1)-(N) to the client device 104 for storing in the cache 114 of the device 104.

In some instances, the proxy server 130 may maintain a table 142 indicating which images the proxy server 130 (and/or another entity of the image service 120) has previously sent to the client device 104. By doing so, the proxy server 130 may refrain from sending an image more than once to the client device. In the instant example, for instance, the proxy server may send the images that are immediately adjacent to the image 110(5) less any previously sent images. For instance, the proxy server 130 may refrain from sending the image 110(1), since the table 142 may indicate that the client device 104 has already received this image upon initially requesting to render the image collection 106. By refraining from sending images that the client device already stores, the caching logic 140 lessens the size of the package being sent over the network 122 to the client device 104, further lessening the latency experienced by the user.

Upon receiving the images from the proxy server 130, the caching logic 118 may identify that these images are immediately adjacent to the image currently being rendered (image 110(5)), and may accordingly store these images in the cache 114. By doing so, the client device 104 is now ready to quickly retrieve and render the appropriate image in the event that the user 102 navigates with the image collection to an image that is immediately adjacent to the image 110(5).

Returning to the proxy server 130, in addition to identifying and sending immediately adjacent images to the client device 104, the caching logic 140 of the proxy server may attempt to refill its cache 136 with images that are immediately adjacent to the images just sent to the client device 104. As such, the caching logic 140 may send the indication of the navigation to the prediction server 128. Each server and/or component within the image service 120 may communicate with one another over one or more networks, which may be the same or different than the network 122 over which the client device 104 communicates with the proxy server 130. In each instance, these networks may comprise any one or combination of multiple different types of networks, such as the Internet, cable networks, cellular networks, wireless networks, and wired networks. In the example where the client device 104 comprises a mobile phone or other mobile computing device, the network 122 may comprise a cellular or other wireless network.

After receiving the indication of the navigation from the proxy server 130, caching logic 144 stored on or accessible by the prediction server 128 may identify the client device 104 and the image collection 106 that the client device 104 currently renders. Even more, the caching logic 144 may identify the particular image that the client device 104 currently renders (here, the image 110(5)) based on the received indication. In addition, the caching logic 144 may reference the layout file 112 to identify one or more sets of images that the prediction server 128 may send to the proxy server and/or the client device 104.

For instance, the caching logic 144 may identify a first set of images that is for storing in the cache 114 of the client device 104 and a second set of images that is for storing in the cache 136 of the proxy server 130. In one example, the first set of images comprises those images in the image collection 106 that are immediately adjacent to the currently rendered image 110(5), while the second set of images are images that are immediately adjacent to the first set of images in the collection 106.

After identifying one or both of these sets of images, the caching logic 144 may reference a table 146 that stores indications of images previously sent to the proxy server and/or the client device 104 by the prediction server 128 and/or any other entity of the image service 120. Thereafter, the caching logic 144 may retrieve, from the storage 134 of the storage server 126, those images of the first and second sets not previously sent to the proxy server and/or the client device 104 and may store these images (temporarily or persistently) in a storage 148 of the prediction server 128. The caching logic 144 may then send these images to the proxy server 130 and/or the client device 104.

In the instant example, for instance, the caching logic 144 may identify that the client device 104 is currently rendering the image 110(5). In addition, the caching logic 144 may identify, from the table 146, that the proxy server 130 has previously received the images in the collection 106 that are immediately adjacent to the image 110(5). As such, the caching logic 144 may refrain from providing these immediately adjacent images to the proxy server. Next, however, the caching logic may identify that a portion of the images that are immediately adjacent to the immediately adjacent images have not yet been sent to the proxy server 130. As such, the caching logic 144 may retrieve these images from the storage server 126 and send these images to the proxy server 130. In addition, the prediction server 128 may update the table 146 to indicate that these images have now been sent to the proxy server 130.

Upon receiving these images from the prediction server 128, the proxy server 130 may store the images in the cache 136, while refraining from sending these images to the client device 104 absent receipt of another indication that the user has yet again navigated within the image collection. By doing so, the proxy server 130 stores, in an easily-accessibly cache, images that are immediately adjacent to images that are immediately adjacent to the image 110(5) currently being rendered by the client device 104. As such, if the user were to navigate within the image collection 106, the images stored in the proxy server 130 may become immediately adjacent to the new image to which the user 102 navigates and, as such, the proxy server 130 may provide these images for storage in the cache 114 of the client device 104.

In total, the architecture 100 provides a multi-level caching system that is able to predict which images of an image collection a user is most likely to navigate to and distribute these images in an intelligent manner across the architecture. For instance, the architecture 100 may store a first set of predicted images in a cache of the client device 104 rendering the image collection, while storing a second set of predicted images in a cache of the proxy server 130 that is nearer the client device 104 than the storage server 126. Storing the images in this manner may therefore reduce the latency experienced by the user 102 as the user 102 navigates within the image collection 106 on the client device 104.

Of course, while one example architecture 100 has been illustrated and described, it is to be appreciated that multiple other architectures may implement the techniques described herein.

FIGS. 2A-2E illustrate an example flow of operations 200 within the architecture of FIG. 1 after the user 102 has requested to the view the image collection 106. As such, the flow of operations occur after the client device 104 has received and parsed the layout file 112, rendered the initial image 110(1) on the display 108 of the device 104, and stored, in the cache 114, the images 110(2)-(5) that are immediately adjacent to the image 110(1). In addition, the prediction server 128 has provided, to the proxy server 130, images that are immediately adjacent to the images 110(2)-(5) for storage in the cache 136.

Figure 2A:
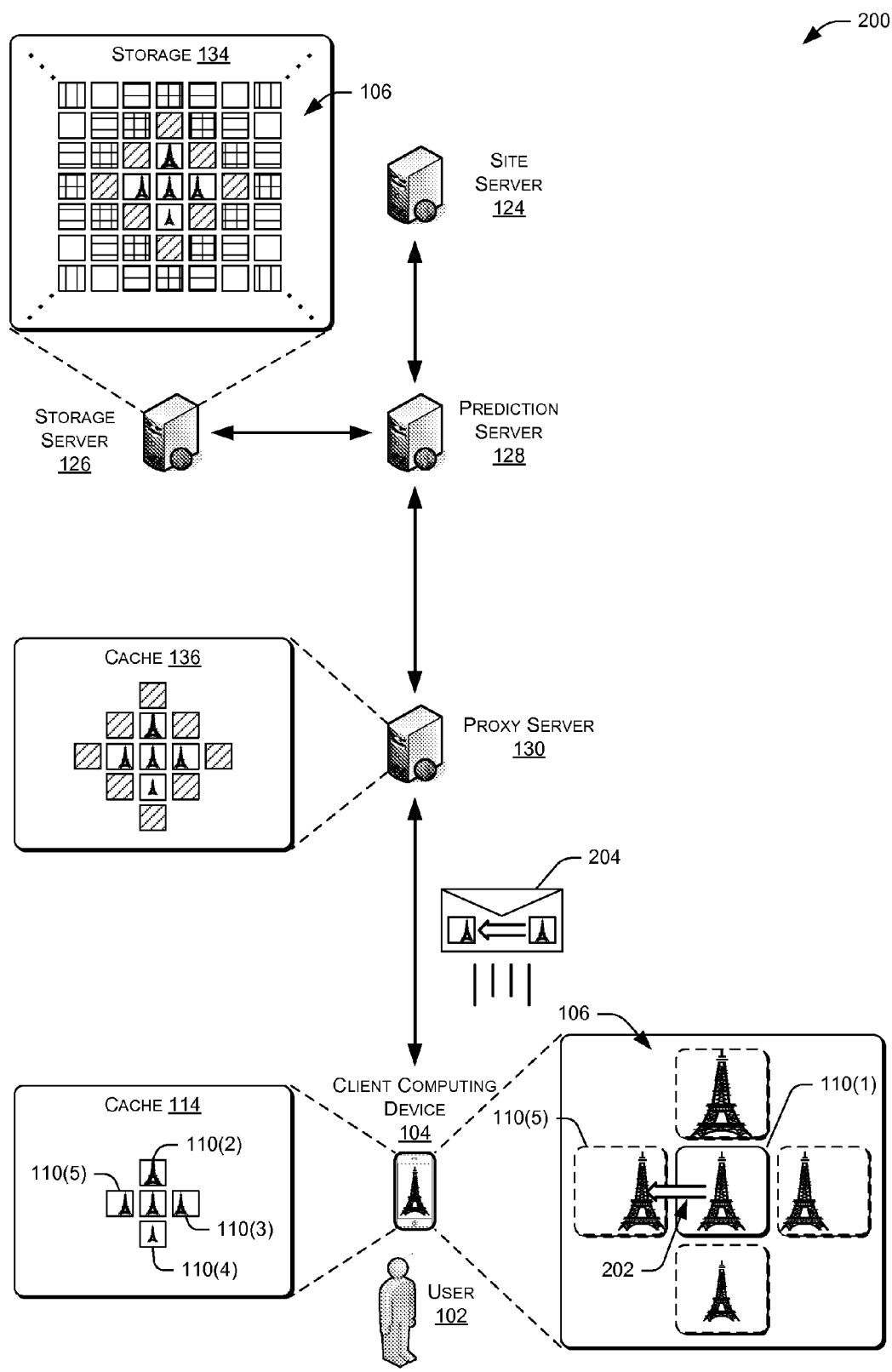
FIGS. 2A-2E illustrate an example flow of operations within the architecture of FIG. 1. Here, a user navigates to a new image within the rendered collection of images and, in response, the prediction server predicts which images the user is now most likely to navigate to within the collection. In addition, the prediction server sends these predicted images for storing on the cache of the proxy server and/or the client device.

FIG. 2A first illustrates the user 102 operating the client device to navigate from the initial image 110(1) to a subsequent image 110(5) that is immediately adjacent to the image 110(1), as indicated by an arrow 202. In response, the client device 104 retrieves the requested image 110(5) from the cache 114 and renders the image 110(5) on the display. In addition, the client device 104 may send an indication 204 of this navigation to the proxy server 130.

Figure 2B:
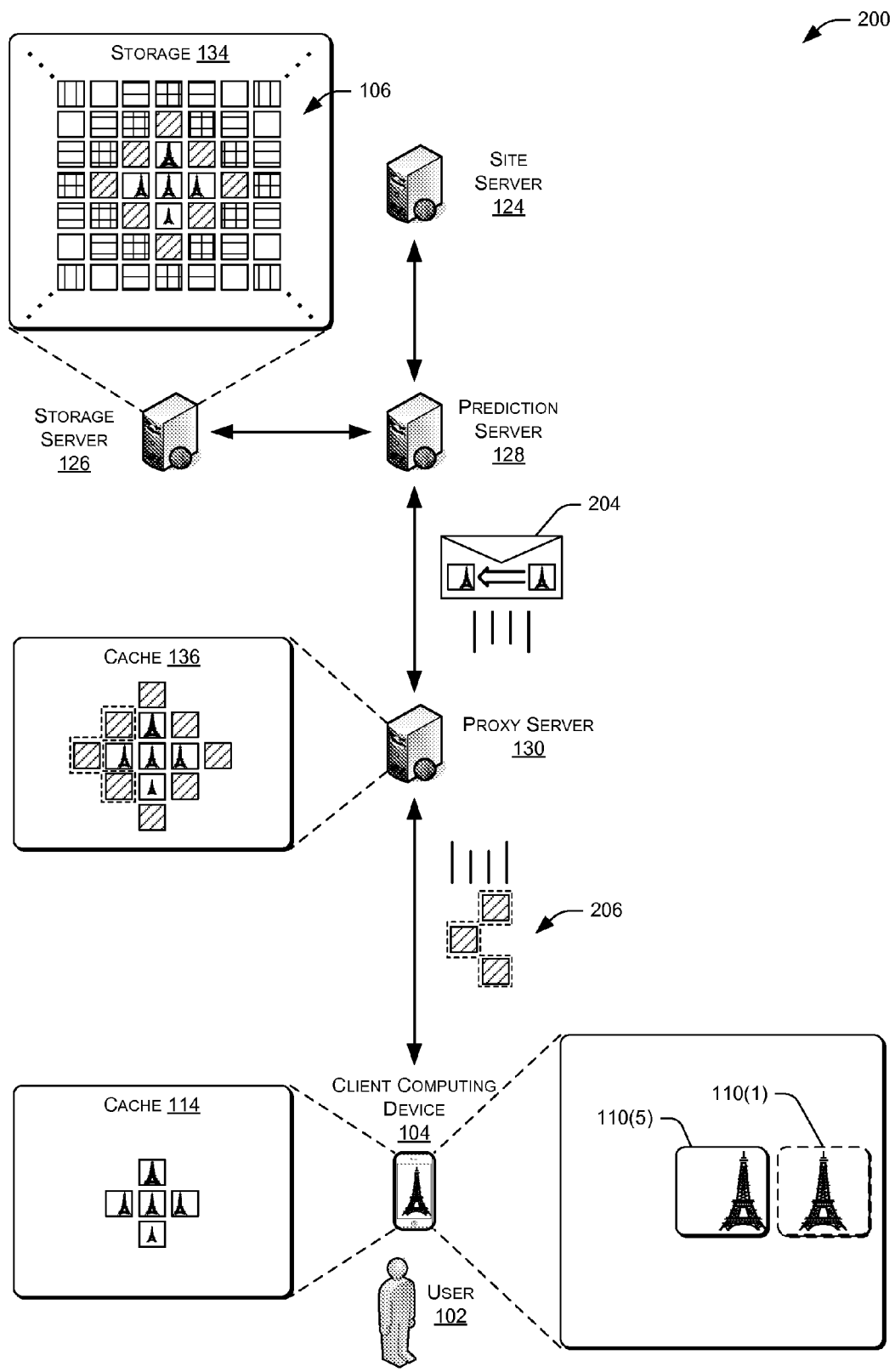

FIG. 2B illustrates the operations 200 after the proxy server 130 receives the indication 204 from the client device 104. In response, the proxy server first identifies the client device 104, the image collection 106, and the image 110(5) that the user 102 has navigated to within the image collection 106. Furthermore, the proxy server 130 may identify a set of images within the layout that are immediately adjacent to the image 110(5), as well as images of this set that have previously been sent to the client device 104. In this instance, the proxy server 130 determines that three of the four images of the identified set have not yet been sent to the client device 104. As such, the proxy server 130 sends a package 206 comprising these three images to the client device 104 for storing in the cache 114. In addition, the proxy server 130 may send the indication 204 along to the prediction server 128.

Figure 2C:
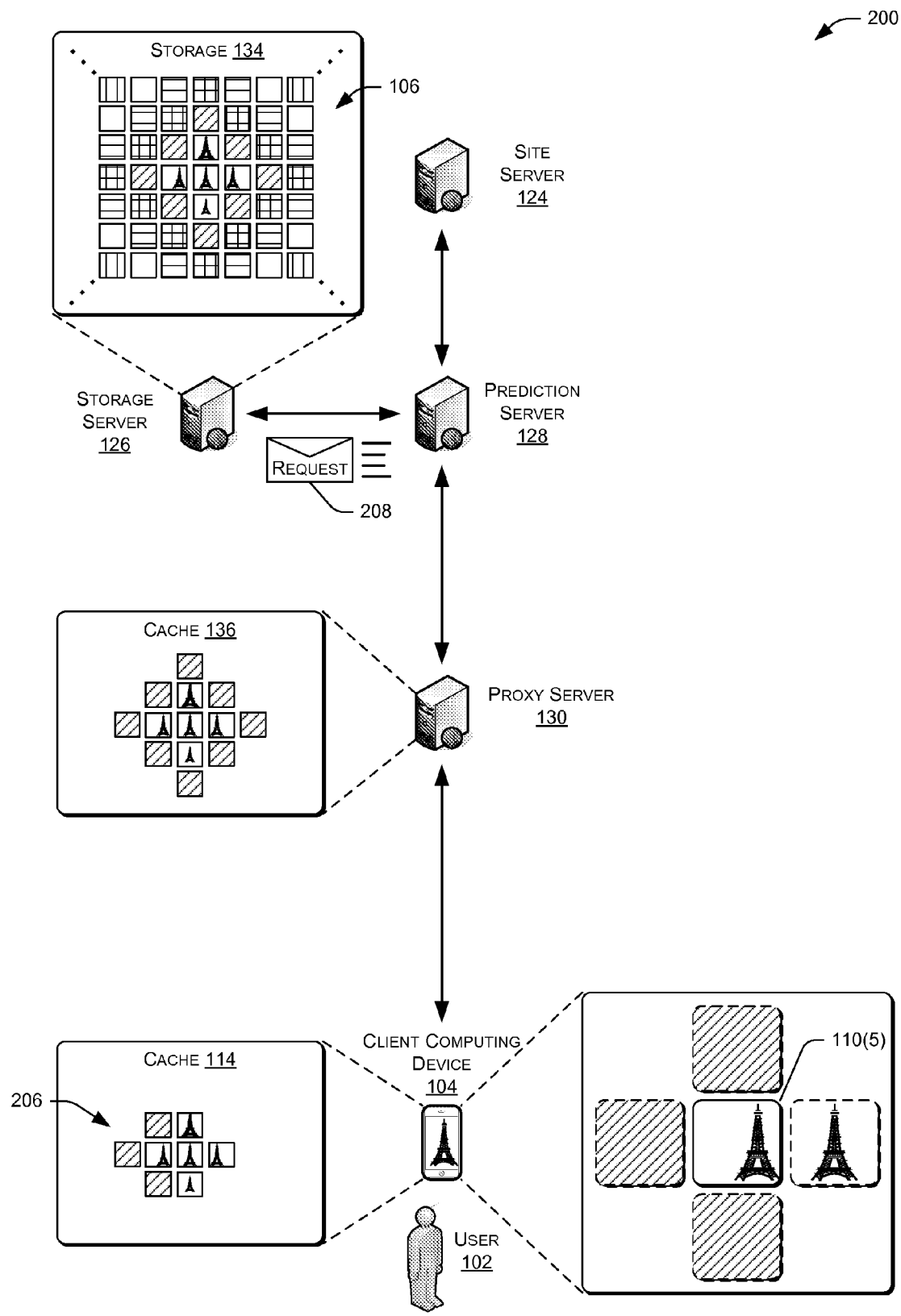

FIG. 2C illustrates the flow of operations 200 after the client device 104 receives the images from the proxy server 130 and after the prediction server 128 receives the indication from the proxy server 130. As illustrated, in response to receiving the package 206 from the proxy server 130, the client device 104 has stored the three images of this package 206 in the cache 114. When these three images are combined with the initial and previously rendered image 110(1), the cache 114 of the client device 104 now stores each image that is immediately adjacent to the image 110(5) currently being rendered. As such, if the user 102 navigates to yet another immediately adjacent image, the client device 104 will be able to quickly retrieve this image from the cache 114 and render this image on the display 108.

In response to receiving the indication 204 from the proxy server 130, meanwhile, the prediction server 128 has identified the client device 104, the image collection 106 being rendered by the client, as well as the image 110(5) to which the user 102 has navigated. With this information, the prediction server 128 has identified a first set of images comprising images that are immediately adjacent to the image 110(5), as well as a second set of images that are immediately adjacent images of the first set. In addition, the prediction server has identified which images of the first and second sets have been previously received by the proxy server 130 and/or the client device 104. The prediction server 128 then generates a request 208 for images of the first and second sets, less any previously sent images. The illustrated request 208 is representative of the prediction server 128 sending a request for the images to the storage server 126, or simply the prediction server 128 retrieving the desired images from the storage server 126.

In this instance, the prediction server 128 will determine that the client device 104 has already received each image of the first set of images (i.e., the immediately adjacent images), as well as that the proxy server 130 has received a portion of the images of the second set of images (i.e., images immediately adjacent to images of the first set). As such, the prediction server 128 will send a request for the remaining images of the second set to the storage server 126.

Figure 2D:
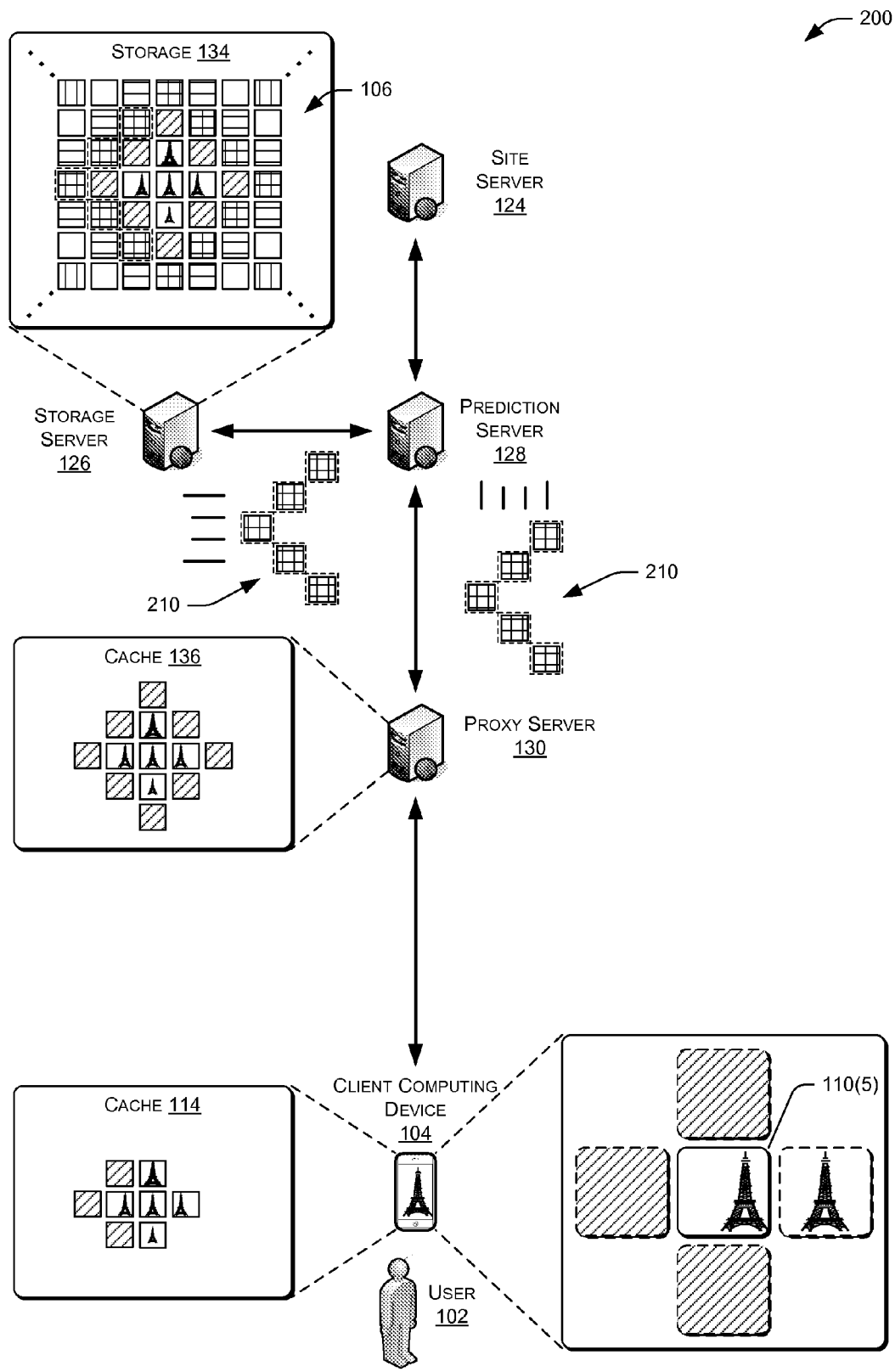

FIG. 2D illustrates that, in response to sending the request 208, the prediction server 128 may receive a package 210 comprising the images of the second set (less the images that the proxy server 130 already has on hand). FIG. 2D also illustrates that the prediction server 128 sends this package 210 to the proxy server 130. As described above, images of this package 210 are for storing in the cache 136 of the proxy server 130, which resides nearer (geographically and/or in terms of latency) to the client device 104 than does the storage server 126.

Figure 2E:
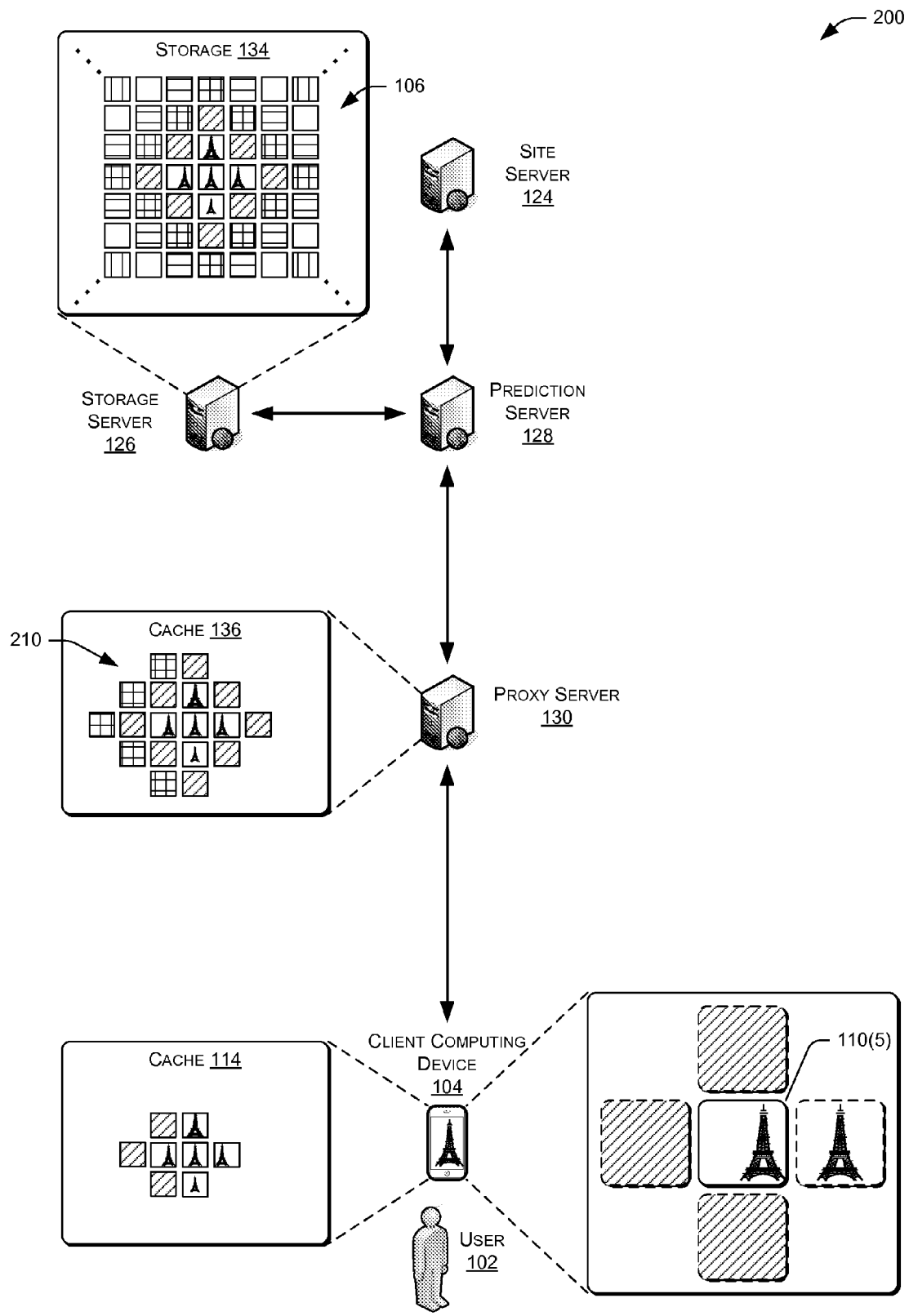

FIG. 2E illustrates the flow of operations 200 after the proxy server 130 receives the package 210. As illustrated, the proxy server 130 stores the images of this package 210 in the cache. Furthermore, when combined with the images previously stored in the cache 136, the proxy server 130 now stores each image that is either: (1) immediately adjacent to the currently rendered image 110(5), or (2) immediately adjacent to these immediately adjacent images. Therefore, if and when the user 102 navigates within the image collection 106 to an image that is immediately adjacent to the image 110(5), the proxy server 130 may send a package of now-immediately adjacent images to the client device 104 for storing in the cache 114 of the client device 104.

Example Image-Prediction Process

Figure 3A:
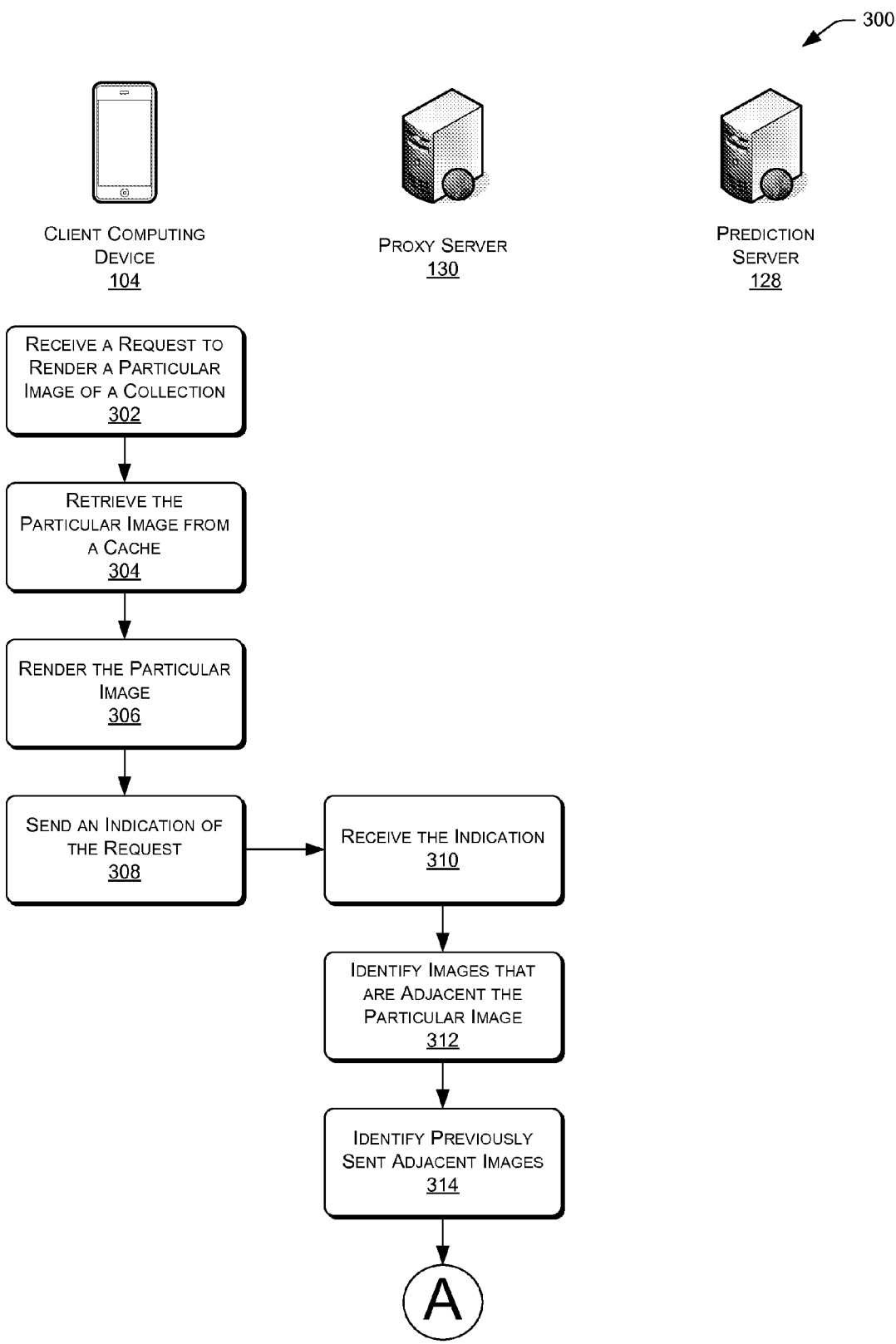
FIGS. 3A-3C illustrate a flow diagram of an example process of predicting, by a prediction server, which images a user of a client device is most likely to navigate to and, in response, storing these images across a cache of the client device and a cache of a proxy server residing between the client device and the prediction server.
Figure 3B:
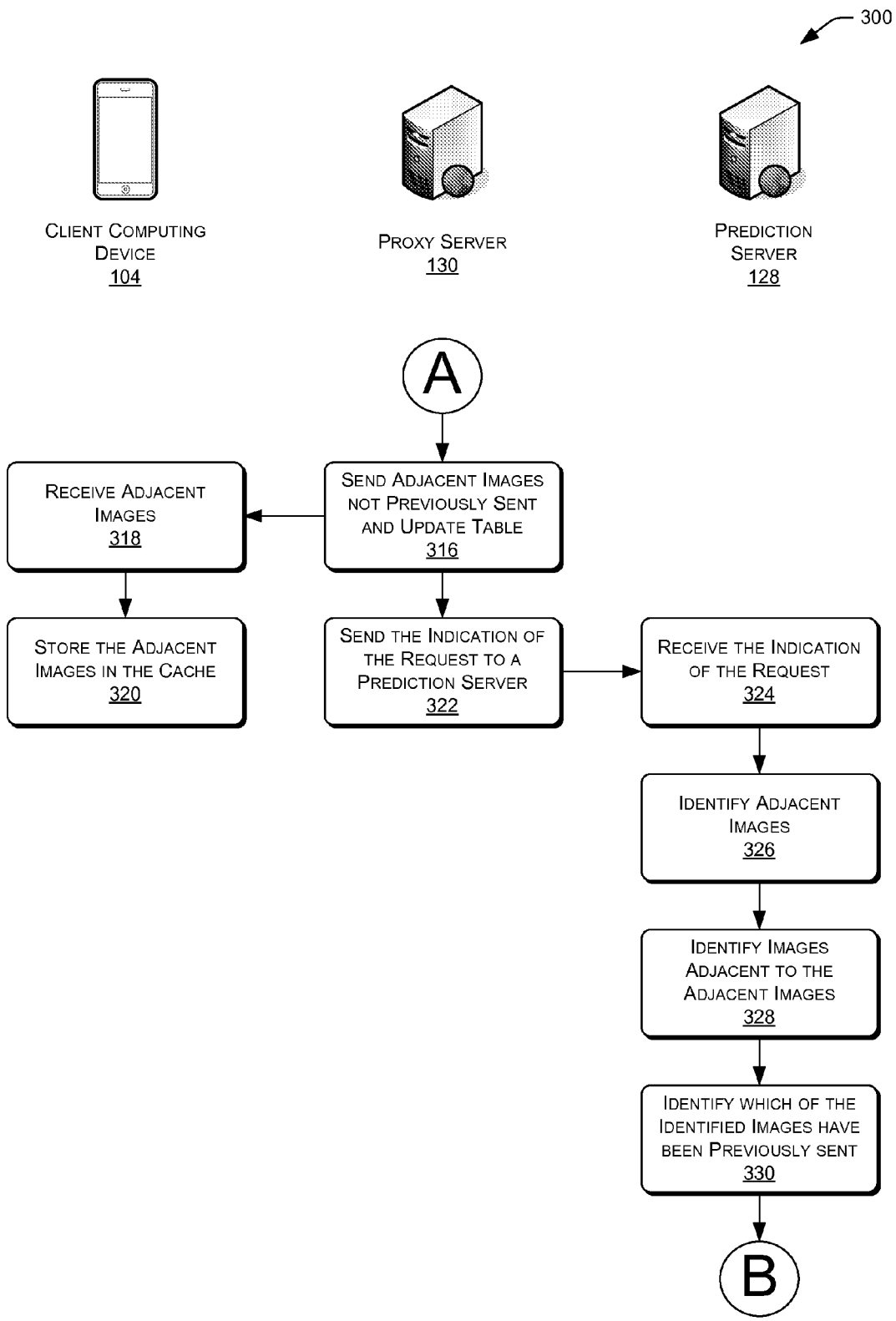
Figure 3C:
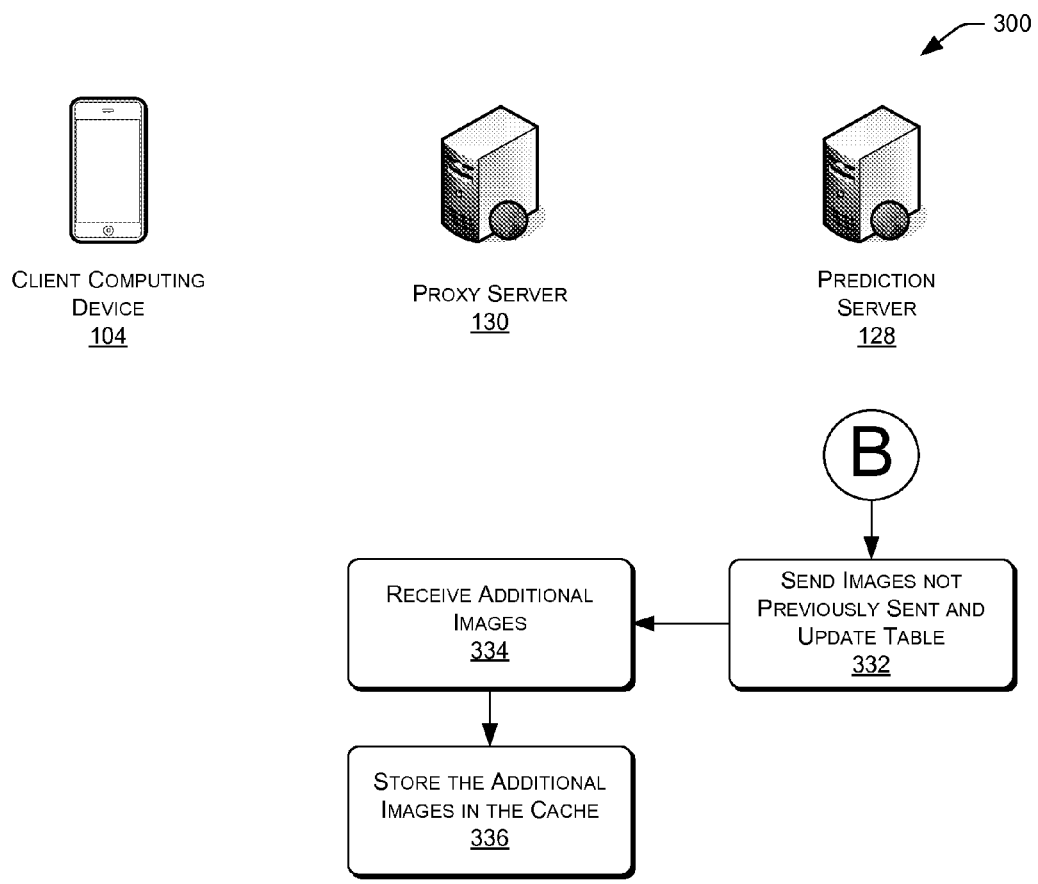

FIGS. 3A-3C comprise a flow diagram of an example process 300 for predicting which images a user is most likely to navigate to within a collection of images associated with a predefined layout and, in response, increasing the accessibility of these images to a client device of the user. This process 300 may occur after the user 102 of the client computing device 104 has requested and begun rendering a collection of images having a predefined layout, such as three-dimensional (3D) model of a series of photographs, a map, or the like.

The process 300 is illustrated as a collection of acts in a logical flow graph, which represents a sequence of operations that can be implemented in hardware, software, or a combination thereof. In the context of software, the blocks represent computer instructions stored on one or more computer-readable media that, when executed by one or more processors, perform the recited operations. Note that the order in which the process is described is not intended to be construed as a limitation, and any number of the described acts can be combined in any order to implement the process, or an alternate process. Additionally, individual blocks may be implemented in parallel with one another or deleted altogether from the process without departing from the spirit and scope of the subject matter described herein. Finally, operations shown under the client computing device 104, the proxy server 130, and the prediction server 128 may be performed by these respective actors, or by other actors, depending upon the implementation.

FIG. 3A first illustrates, at 302, that the client device 104 receives a request to render a particular image of a collection of images having a predefined layout. For instance, the user 102 operating the client device 104 may navigate from a first image to a second image that is immediately adjacent to the first image in the layout. It is to be appreciated that while "an image" being rendered may comprise a single image (e.g., a single digital photograph of a 3D model), in other instances "an image" or "a particular image" may comprise multiple images together. For instance, in the 3D model example, a particular image may comprise an amalgamation of a number of different digital photographs that are collectively being rendered on the display. In these instances, the amalgamation may be treated collectively as "the image" or "the particular image".

At 304, the client device 104 may retrieve the particular image associated with the request from the cache 114 of the device. As described above, the particular image may have been stored in the cache 114 of the client due to the particular image being immediately adjacently to the image from which the user navigated.

At 306, meanwhile, the client device 104 may render the particular image on the display of the device. Because the client device 104 retrieved the image from the cache 114 of the client, this rendering may occur much faster than if the client device 104 were to send a request for the particular image over a network and to the image service 120, as performed by traditional techniques.

At 308, the client device 104 also sends an indication of the request to render the particular image to the proxy server 130. As described above, this indication may be sent over any sort of wireless network, wired network, or combination thereof.

At 310, the proxy server 130 receives the indication. The proxy server 130 may also parse the indication to identify the client device 104, the image collection being rendered, and the particular image to which the user 102 has navigated to within the collection.

At 312, the proxy server 130 uses this information and the layout file 112 to identify images that are immediately adjacent to the particular image to which the user 102 has navigated. For instance, the proxy server 130 may reference the layout file 112 associated with the image collection to identify those images to which the user 102 may navigate to from the particular image with a single user input (i.e., those images that are within a single hop from the particular image in the layout).

At 314, the proxy server 130 identifies which of the immediately adjacent images have been previously sent to the client device. For instance, the proxy server 130 may reference a table 142 associated with the client device 104 to determine which images the client device already stores in the cache 114 of the client device 104 or in a different storage of the client.

FIG. 3B continues the illustration of the process 300 and includes, at 316, the proxy server 130 sending the immediately adjacent images, less the previously sent images, to the client computing device 104. In addition, the proxy server 130 may also update the table 142 to indicate the images being sent, so as to avoid re-sending these same images at a later time.

At 318, the client device 104 receives the additional images from the proxy server. The device 104 may receive these images over a network as a single package or as multiple packages.

At 320, the client device 104 may store the received images in the cache 114 of the client device. By doing so, the client device 104 now has on hand each image that is immediately adjacent to the image that the device currently renders. Therefore, should the user 102 navigate to one of these immediately adjacent images, the device 104 will be able to quickly retrieve and render this image without causing the user 102 to experience a great deal of latency.

At 322, meanwhile, the proxy server 130 may pass the originally received indication to the prediction server 128. The proxy server 130 may send this indication over the same network or a different network than used for communications between the client device 104 and the proxy server 130. In some instances, the servers of the image service 120 communicate over a network that has higher bandwidth and less latency than does the network between which the client device 104 communicates with the proxy server 130.

At 324, the prediction server 128 receives the indication of the image request. Like the proxy server 130 above, the prediction server 128 may parse the indication to identify the client device 104, the image collection being rendered, and the particular image of the collection being rendered.

At 326, the prediction server 128 may identify images that are adjacent to the particular image. As discussed above, this first set of images may be the images for storing on the cache 114 of the client device 104. The prediction server 128 may utilize the layout file 112 to make this identification.

At 328, the prediction server 128 may also identify images that are immediately adjacent to the immediately adjacent images. Also as discussed above, this second set of images may be the images for storing on the cache 136 of the proxy server 130. Again, the prediction server 128 may utilize the layout file 112 to make this identification.

At 330, the prediction server may identify which images of the first and second sets have previously been provided to the proxy server 130 and the client device 104, respectively. In this example, the prediction server 128 determines that the client device 104 has received (or should have received) each image of the first set, but that that the proxy server 130 has yet to receive a portion of the images of the second set. The prediction server 128 may reference the table 146 associated with the client device 104 to make this determination in some instances.

FIG. 3C concludes the illustration of the process 300. At 332, the prediction server 128 sends, to the proxy server 130, the images of the second set that the proxy server 130 has yet to receive.

At 334, the proxy server 130 receives these additional images from the prediction server 128. Again, these images may comprise some or all of the images that are immediately adjacent to the images that are immediately adjacent to the particular image being rendered on the client device 104.

At 336, the proxy server 130 stores these additional images in the cache 136 of the proxy server 130. By doing so, the image service 120 (via the proxy server 130) may quickly provide these images to the client device 104 in the event that the user 102 continues to navigate to images that are immediately adjacent to currently rendered images.

While not shown, in some instances the prediction server 128 may determine that images of the first set of images should be sent to the client device 104. For instance, envision that the user 102 navigates from a first image in the image collection to a second image in the collection that is more than one hop away from the first image within the predefined layout of the collection. In this instance, the prediction server 128 may determine that neither the client device 104 nor the proxy server 130 stores images that are immediately adjacent to the second image. As such, the prediction server 128 may send images of the first set (i.e., the immediately adjacent images) for storing in the cache 114 of the client device. To do so, the prediction server 128 may send these images directly to the client device 104, to the proxy server 130 for delivery to the client device 104, or in any other manner. In addition, the prediction server 128 may determine that the proxy server 130 does not store any images of the second set (i.e., images immediately adjacent to images of the first set). As such, the prediction server 128 may also send this second set of images to the proxy server 130.

Example Caching Logic

Figure 4:
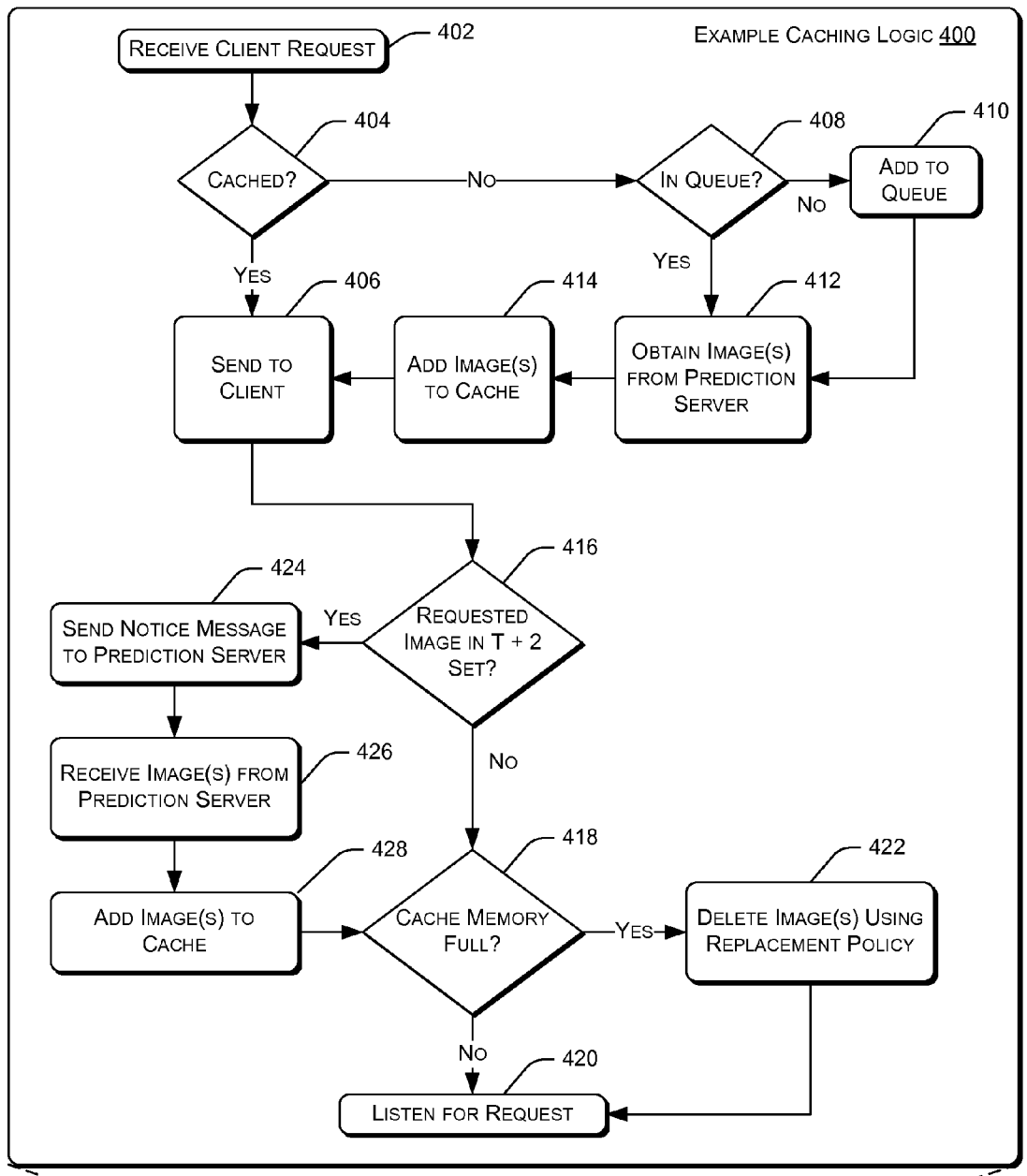
FIG. 4 is an example of caching logic that may reside on the proxy server of FIG. 1.
Figure 5:
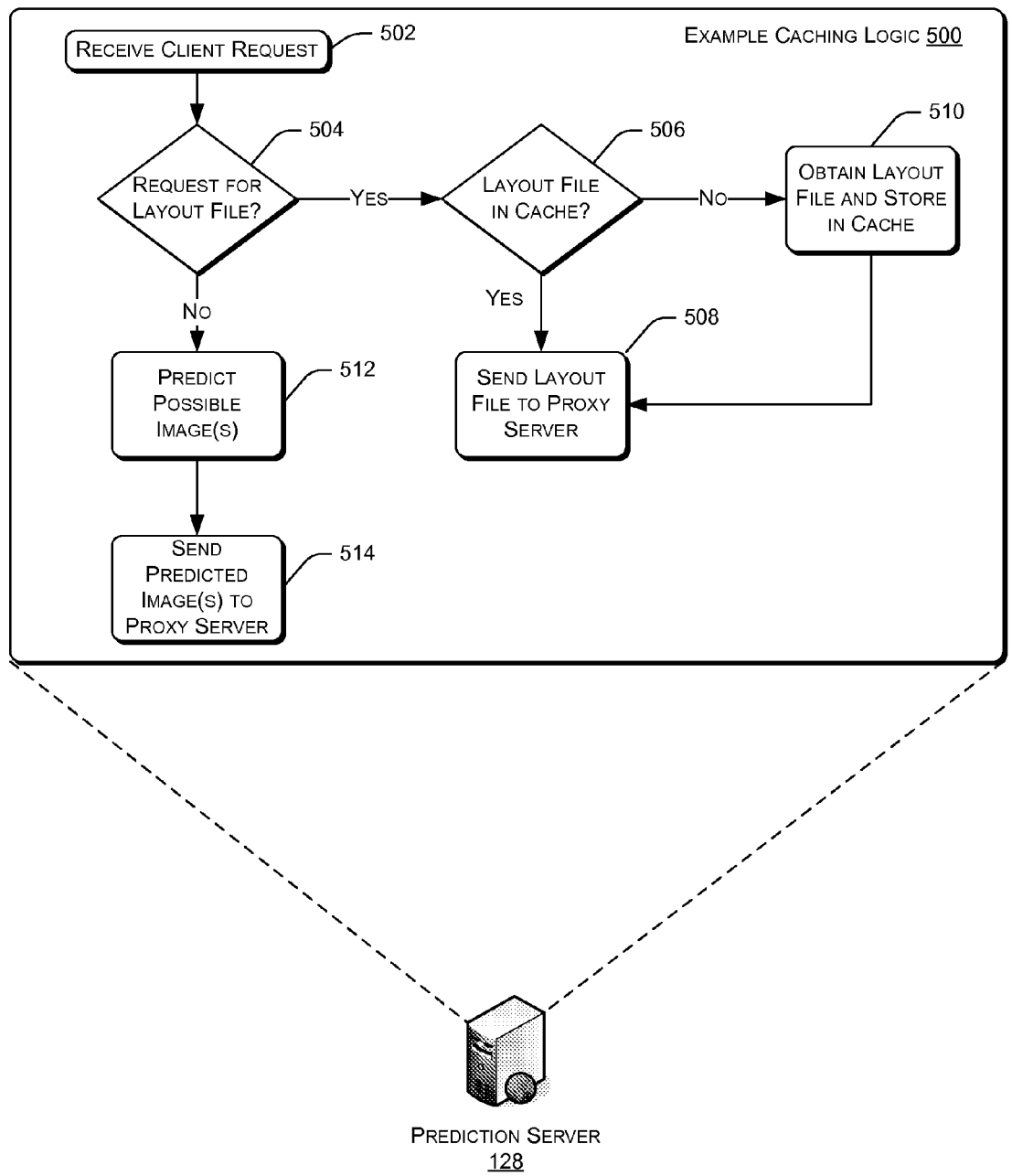
FIG. 5 is an example of caching logic that may reside on the prediction server of FIG. 1.

FIG. 4 is an example 400 of the caching logic 140 that may reside on the proxy server 130. FIG. 5, meanwhile, is an example 500 of caching logic 144 that may reside on the prediction server 128. As with the process 300 above, this example logic may comprise computer-executable instructions stored on one or more computer-readable media that, when executed, configure one or more processors to perform some or each of the recited operations. Furthermore, while one example of each of caching logic 140 and 144 is provided below, it is to be appreciated that the caching logic 140 and 144 may take multiple other forms.

At 402, the example caching logic 400 of the proxy server 130 receives a client request for one or more images. At 404, the logic 400 queries whether the requested images are stored in the cache 136 of the proxy server 130. If so, then at 406 the caching logic 400 sends the requested images to the client device. If not, however, then the caching logic queries at 408 whether the images are already stored in a queue of images being requested from the prediction server 128. If not, then at 410 the logic 400 adds the images to the queue. After doing so (or if the images were already in the queue), the proxy server 130 obtains the images from the prediction server at 412 and, at 414, the proxy server 130 stores these images in the cache 136 of the proxy server 130. Then, at 406, the proxy server 130 sends the images to the client device.

At 416, the example logic 400 queries whether the requested one or more images are in the "T+2" set, where "T" denotes the image that the client device currently renders, "T+1" denotes images immediately adjacent to "T", and "T+2" denotes images immediately adjacent the "T+1" images. If not, then at 418 the logic queries whether the cache 136 of the proxy server is full (i.e., has less than a threshold amount of storage space remaining). If not, then at 420 the example caching logic 400 continues to listen for additional client requests. If, however, the cache 136 is full, then at 422 the caching logic 400 deletes certain images within the cache at 422 according to a predefined image-replacement policy before continuing to listen for client requests at 420.

Returning to the decision block 416, if the example logic 400 determines that a requested image is in the "T+2" set, then the logic 400 sends a notice message to the prediction server 128 at 424. At 426, and in response, the example caching logic 400 receives the images from the prediction server 128 and, at 428, stores the images in the cache 136. Again, the example caching logic 400 then determines whether or not the cache 136 is full and operates accordingly, eventually continuing to listen for additional client requests at 420.

FIG. 5 illustrates the example caching logic 500 of the prediction server 128. At 502, the prediction server 128 receives a client request, potentially from the proxy server 130. At 504, the logic 500 queries whether this request is for a layout file (e.g., the layout file 112). If so, then the logic 500 queries at 506 whether the requested layout file is stored in a cache of the prediction server 128. If so, then at 508 the prediction server 128 sends the layout file to the proxy server 130 at 508. If not, however, then the example caching logic 500 obtains the layout file and stores this file in the cache of the prediction server at 510, before sending the file to the proxy server 130 at 508.

Returning to the decision block 504, if the example caching logic 500 determines that the client request is not for a layout file (and, hence, is for one or more images of an image collection), then at 512 the example logic 500 predicts one or more possible images that a user may navigate to. For instance, the example caching logic 500 may identify a first set of images that are immediately adjacent to the image that the client device currently renders and/or a second set of images that are immediately adjacent to images of the first set. At 514, the example caching logic 500 may send some or each of the predicted images to the proxy server 130. Some of these images may be for storing in the cache 136 of the proxy server 130, some may be for storing in the cache 114 of the client device, and/or some may be for storing in both caches. Furthermore, and as discussed above, in some instances the prediction server 128 may send images of the first set of images directly to the client device or in any other manner, rather than through the proxy server 130.

Example Computing-Device Components

Figure 6:
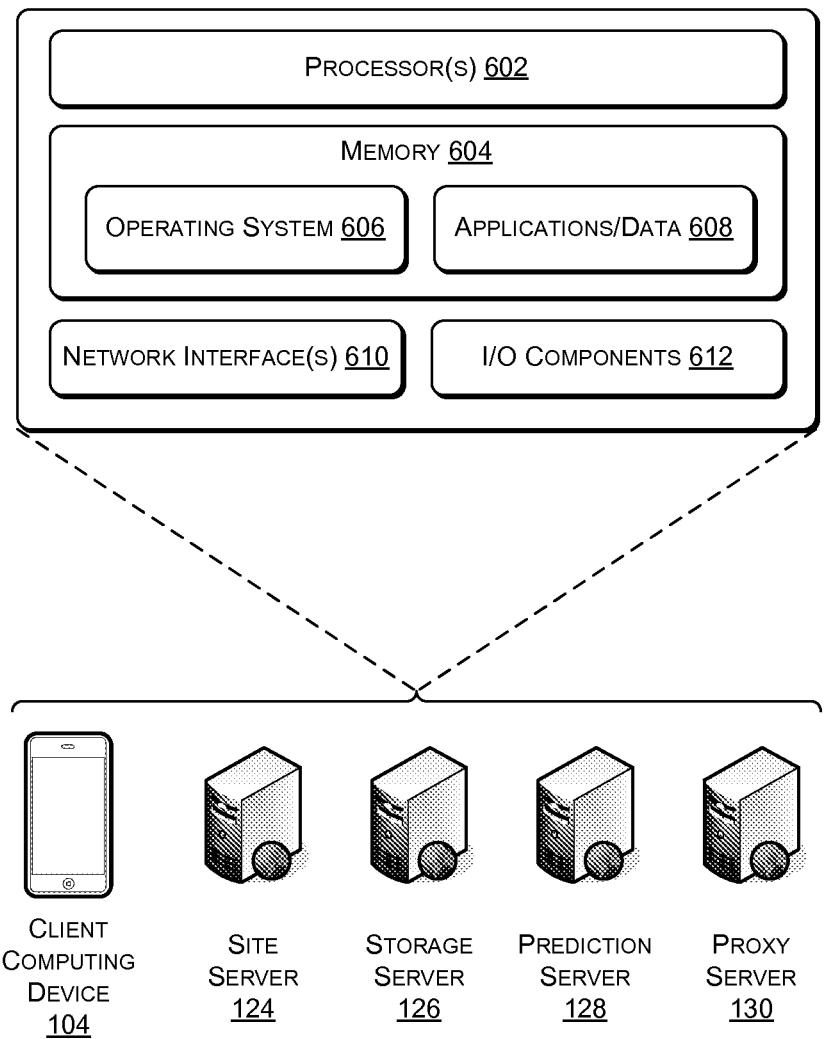
FIG. 6 illustrates several example components that may reside on the client device, the site server, the storage server, the prediction server, and/or the proxy server of FIG. 1.

FIG. 6 illustrates several example components that may reside on the client device 104, the site server 124, the storage server 126, the prediction server 128, and/or the proxy server 130 of FIG. 1. While this illustration depicts a few example components, it is to be appreciated that these computing devices may include multiple other components including the components described and illustrated above, as one of ordinary skill in the art will appreciate.

As illustrated, each of the depicted computing devices includes one or more processors 602 and memory 604. The memory 604 (and other memories described herein) may comprise computer-readable media. This computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Furthermore, the memory 604 may store an operating system (OS) 606, as well as numerous applications and data 608 that run atop the OS 606. Each of the devices may also include one or more network interfaces 610 for communicating with other devices over a network. Finally, each device may include one or more input/output (I/O) components 612 for operating the respective devices. For instance, the client computing device 104 may include a keyboard or keypad, a touchscreen, and/or any other type of input device. In addition, the client computing device may include a display, speakers, and/or any other type of output component. The servers illustrated in FIG. 6 may similarly include other I/O components 612 suitable for operation of these devices, as one of ordinary skill in the art will appreciate.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. At least one computer-readable storage medium storing computer-executable instructions that, when executed by one or more processors of a prediction server, cause the one or more processors to perform acts comprising:

receiving an image request from a proxy server communicatively coupled to the prediction server and to a client computing device, the image request identifying a particular image of a collection of images that represent a map or a three-dimensional (3D) model of a scene, and that a user of the client computing device has navigated to in a map or a three-dimensional (3D) model;

identifying, at the prediction server from the image request, a first set of images of the collection of images for storing on a cache of the client computing device, and a second set of images of the collection of images for storing on a cache of the proxy server, wherein the first set of images comprises images of the collection that are immediately adjacent to the particular image, and the second set of images comprises images of the collection that are immediately adjacent to the images of the first set of images; and sending the first set of images and the second sets of images from the prediction server to the proxy server, wherein the proxy server caches the second set of images and further sends the first set of images to the client computing device.

2. The at least one computer-readable storage medium as recited in claim 1, wherein the image request is received from the proxy server at least partly in response to a user of the client computing device navigating within the map or the 3D model.

3. The at least one computer-readable storage medium as recited in claim 1, the acts further comprising identifying, from the image request, the client computing device, and wherein the sending comprises:

referencing a table associated with client computing device to identify which images of the first and second sets of images the prediction server has previously sent to the proxy server; and sending, to the proxy server, the first and second sets of images less any images that have previously been sent to the proxy server.

4. The at least one computer-readable storage medium as recited in claim 1, the acts further comprising, after the sending, updating a table associated with the client computing device to indicate which images of the collection of images have been sent to the proxy server.

5. A method, comprising:
receiving an image request from a proxy server communicatively coupled to a prediction server and to a client computing device, the image request identifying a particular image of a collection of images, that represent a map or a three-dimensional (3D) model of a scene, and that a user of the client computing device has navigated to in the map or 3D model;
identifying, at the prediction server from the image request, a first set of images of the collection of images for storing on a cache of the client computing device, and a second set of images of the collection of images for storing on a cache of the proxy server, wherein the first set of images comprises images of the collection that are immediately adjacent to the particular image and the second set of images comprises images of the collection that are immediately adjacent to the images of the first set of images;
retrieving the first set of images and the second set of images from a storage server to the prediction server; and
sending the first set of images and the second set of images from the prediction server to the proxy server, wherein the proxy server caches the second set of images and further sends the first set of images to the client computing device.

6. The method as recited in claim 5 wherein the image request is received from the proxy server at least partly in response to a user of the client computing device navigating within the map or the 3D model.

7. The method as recited in claim 5, further comprising identifying, from the image request, the client computing device, and wherein the sending comprises:
referencing a table associated with client computing device to identify which images of the first and second sets of images the prediction server has previously sent to the proxy serve; and
sending, to the proxy server, the first and second sets of images less any images that have previously been sent to the proxy server.

8. The method as recited in claim 5, further comprising, after the sending, updating a table associated with the client computing device to indicate which images of the collection of images have been sent to the proxy server.

9. The method as recited in claim 5, wherein one or more images stored in the proxy server are nearer to the client computing device than one or more images stored in the storage server.

10. A method, comprising:
receiving an image request from a proxy server communicatively coupled to a prediction server and to a client computing device, the image request identifying a particular image of a collection of images, that represent a map or a three-dimensional (3D) model of a scene, and that a user of the client computing device has navigated to in a map or a three-dimensional (3D) model;
identifying, at the prediction server from the image request, a first set of images of the collection of images for storing on a cache of the client computing device, and a second set of images of the collection of images for storing on a cache of the proxy server, the first set of images comprises images of the collection that are immediately adjacent to the particular image, and the second set of images comprises images of the collection that are immediately adjacent to the images of the first set of images; and
sending the first set of images and the second set of images from the prediction server to the proxy server, the proxy server to stores the second set of images and further sends the first set of images to the client computing device.

11. The method as recited in claim 10, wherein the image request is received from the proxy server at least partly in response to the user of the client computing device navigating within the map or the 3D model.

12. The method as recited in claim 10, further comprising, after the sending, updating a table associated with the client computing device to indicate which images of the collection of images have been sent to the proxy server.

13. The at least one computer-readable storage medium as recited in claim 1, wherein the acts further comprises retrieving the first set of images and the second set of images from a storage server to the prediction server prior to the sending the first set of images and the second sets of images from the prediction server to the proxy server.

14. The at least one computer-readable storage medium as recited in claim 13, wherein one or more images stored in the proxy server are nearer to the client computing device than one or more images stored in the storage server.

15. The at least one computer-readable storage medium as recited in claim 14, wherein one or more images in the proxy server are nearer to the client computing device that one or more images stored in the storage server.

* * * * *